3,287,360
3-CARBOXY-BENZOTHIADIAZINE DERIVATIVES

Frederick C. Novello, Berwyn, Pa., assignor to Merck & Co., Inc., Rahway, N.J., a corporation of New Jersey
No Drawing. Filed Dec. 27, 1960, Ser. No. 78,267
12 Claims. (Cl. 260—243)

This invention is concerned with novel sulfamyl-1,2,4-benzothiadiazine-1,1-dioxide compounds having the following general formula

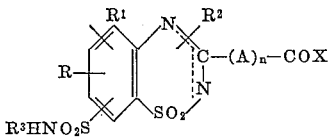

wherein R represents hydrogen, a lower alkyl radical advantageously having from 1 to 5 carbon atoms, halogen or a halogen-like radical such as chlorine, bromine, fluorine, trifluoromethyl, trichloromethyl and the like, a lower alkoxy radical advantageously having from 1 to 5 carbon atoms or the nitro group; $R^1$ represents lower alkyl, hydrogen or a halogen; $R^2$ is attached either to the nitrogen in the 2-position or the nitrogen in the 4-position and represents either hydrogen or a lower alkyl radical; $R^3$ represents hydrogen or a lower alkyl radical; A represents an aliphatic group either saturated or unsaturated and preferably having up to 6 carbon atoms or is an aromatic group preferably the phenyl group; $n$ is an integer from 0 to 1; and X represents an aliphatic-oxy radical such as a lower alkoxy or a lower alkenyloxy group, an aryloxy group such as the phenoxy group, the OH group, an O-alkali metal group such as the OK or ONa group, an amide group, the hydrazide group, or the phenyl group.

The novel compounds of this invention possess diuretic, natriuretic and/or sauretic properties (hereinafter referred to as diuretic properties). These compounds, therefore are useful in the treatment of abnormalities which produce an edematous condition in the body or which produce an imbalance in the electrolyte concentration as, for example, those conditions in which abnormal retention of sodium occurs. The compounds, therefore, find use especially in the treatment of edematous conditions, congestive heart failure, and other abnormalities caused by an excessive retention of sodium.

These compounds can be administered in therapeutic dosages in conventional vehicles as in the form of tablets, pills, capsules, and the like, as they are effective upon oral administration. They also can be administered parenterally in sterile solution, if desired.

The novel compounds of this invention wherein X is an aliphatic-oxy, aryloxy, amide, hydrazide or phenyl radical can be readily prepared from the appropriate disulfamylaniline compound having an esterified carboxyacyl group attached to the aniline nitrogen. The ring closure of these compounds is base catalyzed with a wide variety of basic substances such as ammonia, an aqueous primary or secondary amine, an alcoholic tertiary amine, or by treatment with a salt formed by reaction of a weak acid with a strong base such as by treatment with potassium acetate, sodium acetate and the like.

The free acid can readily be obtained from the esters of this invention by acid hydrolysis. Treatment of the acid thus obtained with one equivalent of sodium or potassium hydroxide will produce the desired salt.

The cyclized product obtained by one or another of the above methods can be converted to its dihydro derivative by treatment of a solution of the sodium salt of the cyclized product in water with sodium borohydride at room temperature or by heating under reflux the cyclized compounds with sodium borohydride in tetrahydrofuran.

Alternatively the cyclized product can be reduced in the presence of ruthenium to the desired dihydro derivative.

While the above discussion outlines general methods suitable for the preparation of the novel compounds of this invention, it is to be understood that the methods described above as well as those described in the following examples are illustrative of those methods which can be employed an dare not to be construed as limiting the invention to the particular methods or the particular compounds specifically described.

EXAMPLE 1

*3-(gamma-carbomethoxypropyl)-6-chloro-7-sulfamyl-1,2,4-benzothiadiazine-1,1-dioxide*

Step A.—A solution of 0.2 mole of 5-chloro-2,4-disulfamylaniline and 0.22 mole of gamma-carbomethoxybutyryl chloride in 450 ml. of dioxane is heated under reflux for about 24 hours. The reaction mixture thereafter is cooled and the product which precipitates is collected on the filter. After recrystallization from water there is obtained 5-chloro-2,4-disulfamyl-N-(gamma-carbomethoxybutyryl)aniline, M.P. 173–175° C.

*Analysis.*—Calculated for $C_{12}H_{16}ClN_3O_7S_2$: C, 34.82; H, 3.90; N, 10.15. Found: C, 34.96; H, 4.20; N, 10.11.

Step B.—A solution of the above obtained product in 50 ml. of 25% methanolic trimethylamine is allowed to stand at room temperature for 24 hours and concentrated to dryness in vacuo. The residue is crystallized from methanol to give 3-(gamma-carbomethoxypropyl)-6-chloro-7-sulfamyl-1,2,4-benzothiadiazine-1,1-dioxide.

EXAMPLE 2

*3-(gamma-carboxypropyl)-6-chloro-7-sulfamyl-1,2,4-benzothiadiazine-1,1-dioxide*

A solution of 3-(gamma-carbomethoxypropyl)-6-chloro-7-sulfamyl-1,2,4-benzothiadiazine-1,1-dioxide (from Example 1) in 25 ml. of water, 25 ml. of acetic acid and 25 ml. of concentrated hydrochloric acid is heated under reflux for 2 hours and cooled in an ice bath. The product is collected and recrystallized from a mixture of alcohol and water to give 3-(gamma-carboxypropyl)-6-chloro-7-sulfamyl-1,2,4-benzothiadiazine-1,1-dioxide.

EXAMPLE 3

*3-(gamma-methylcarbamylpropyl)-6-chloro-7-sulfamyl-1,2,4-benzothiadiazine-1,1-dioxide*

A solution of 5-chloro-2,4-disulfamyl-N-(gamma-carbomethoxybutyryl)aniline, 25.0 g. (from Example 1, step A) in 100 ml. of 20% aqueous methylamine is allowed to stand at room temperature for 24 hours. Water (90 ml.) is added, the mixture filtered and the filtrate acidified. The precipitate is collected giving 3-(gamma-methylcarbamylpropyl)-6-chloro-7-sulfamyl-1,2,4-benzothiadiazine-1,1-dioxide.

EXAMPLE 4

*Sodium salt of 3-(gamma-carboxypropyl)-6-chloro-7-sulfamyl-1,2,4-benzothiadiazine-1,1-dioxide*

3-(gamma-carboxypropyl)-6-chloro-7-sulfamyl-1,2,4-benzothiadiazine-1,1-dioxide is treated with an alcoholic solution of 1 equivalent of sodium hydroxide at room temperature for 3 hours. The alcohol is removed by evaporation to give the sodium salt of 3-(gamma-carboxypropyl)-6-chloro-7-sulfamyl-1,2,4-benzothiadiazine-1,1-dioxide.

EXAMPLE 5

*3-(delta-carbethoxybutyl)-6-chloro-7-sulfamyl-1,2,4-benzothiadiazine-1,1-dioxide*

Step A.—By replacing the gamma-carbomethoxybutyryl chloride employed in Example 1, step A, by an equivalent quantity of 5-carbethoxyvaleryl chloride and following substantially the same procedure described in Example 1, step A, there is obtained 5-chloro-2,4-disulfamyl-N-(delta-carbethoxyvaleryl)aniline which, after recrystallization from a 50% mixture of alcohol and water, melts at 171–173° C.

*Analysis.*—Calculated for $C_{14}H_{20}ClN_3O_7S_2$: C, 38.05; H, 4.56; N, 9.52. Found: C, 38.30; H, 4.72; N, 9.37.

*Step. B.*—A solution of 6.6 g. of the aniline compound thus obtained and 1.65 g. of potassium acetate in 100 ml. of water is heated on the steam bath for 24 hours and the precipitate is collected on the filter and recrystallized from alcohol-water to give 3-(delta-carbethoxybutyl)-6-chloro - 7-sulfamyl - 1,2,4-benzothiadiazine - 1,1-dioxide, M.P. 219–220° C.

*Analysis.*—Calculated for $C_{14}H_{18}ClN_3O_6S_2$: C, 39.67; H, 4.27; N, 9.91. Found C, 40.09; H, 4.31; N, 9.91.

EXAMPLE 6

*3-(delta-carboxybutyl)-6-chloro-7-sulfamyl-1,2,4-benzothiadiazine-1,1-dioxide*

The 3-(delta-carbethoxybutyl) - 6-chloro - 7-sulfamyl-1,2,4-benzothiadiazine-1,1-dioxide (from Example 5) is hydrolyzed by substantially the same method described in Example 2 to give 3-(delta-carboxybutyl)-6-chloro-7-sulfamyl-1,2,4-benzothiadiazine-1,1-dioxide, M.P. 251–252° C.

*Analysis.*—Calculated for $C_{12}H_{14}ClN_3O_6S_2$: C, 36.41; H, 3.57; N, 10.62. Found: C, 36.79; H, 3.71; N, 10.61.

EXAMPLE 7

*3-carbethoxy-6-trifluoromethyl-7-sulfamyl-1,2,4-benzothiadiazine-1,1-dioxide*

*Step. A*—2-amino - 4 - trifluoromethylbenzenesulfonic acid (32 g., 0.132 mole) is added portionwise with stirring to 100 ml. of chlorosulfonic acid and cooled in an ice bath over a 5 to 10 minute period. The solution is heated in an oil bath at 150° C. for three hours and then cooled to 20° C. Thionyl chloride (40 ml.) is added and the mixture heated on the steam bath for one hour, then cooled to 0° C. and poured cautiously onto ice. The aqueous liquor is decanted and the residual solid heated on the steam bath with 500 ml. of 28% ammonium hydroxide for 2 hours. Upon cooling the product precipitates and is collected on the filter, washed with water and dried. To remove a trace amount of 2-sulfamyl-5-trifluoromethylaniline that is obtained along with the product, the material remaining on the filter is digested with 500 ml. of boiling benzene, filtered and the benzene-soluble material recrystallized from aqueous alcohol yielding 2,4-disulfamyl-5-trifluoromethylaniline as colorless needles, M.P. 241–242° C.

*Step B.*—By replacing the 5-chloro-2,4-disulfamylaniline employed in Example 1, step A, by an equivalent quantity of the product obtained as described above, and also replacing the gamma-carbomethoxybutyryl chloride employed in Example 1, step A, by an equivalent quantity of ethoxalyl chloride, and following substantially the same procedure described in Example 1, step A, there is obtained 5-trifluoromethyl - 2,4-disulfamyl-N-ethoxalylaniline which, after recrystallization from a 50% mixture of alcohol and water, melts at 228° C.

*Analysis.*—Calculated for: $C_{11}H_{12}N_3S_3O_7S_2$: C, 31.50; H, 2.89; N, 10.02. Found: C, 31.61; H, 3.16; N, 10.06.

*Step C.*—The ethoxalylaniline obtained above then is cyclized by substantially the same procedure described in Example 1, step B, to give 3-carbethoxy-6-trifluoromethyl-7-sulfamyl-1,2,4- benzothiadiazine-1,1-dioxide.

EXAMPLE 8

*3-carboxy-6-trifluoromethyl-7-sulfamyl 1,2,4-benzothiadiazine-1,1-dioxide*

The 3-carbethoxy - 6-trifluoromethyl - 7-sulfamyl - 1,2, 4-benzothiadiazine-1,1-dioxide (from Example 7) is hydrolyzed by substantially the same method described in Example 2 to give 3-carboxy - 6-trifluoromethyl - 7-sulfamyl-1,2,4-benzothiadiazine-1,1-dioxide.

EXAMPLE 9

*3-methylcarbamyl-6-trifluoromethyl-7-sulfamyl-1,2,4-benzothiadiazine-1,1-dioxide*

By replacing the aniline compound employed in Example 3 by an equivalent quantity of 5-trifluoromethyl-2,4-disulfamyl-N-ethoxalylaniline (from Example 7, step B) and following substantially the same procedure described in Example 3, there is obtained 3-methylcarbamyl-6-trifluoromethyl - 7-sulfamyl - 1,2,4-benzothiadiazine-1,1-dioxide.

EXAMPLE 10

*2-methyl-3-carboethoxy-6-chloro-7-sulfamyl-1,2,4-benzothiadiazine-1,1-dioxide*

*Step A.*—A solution of 68.3 g. of 2-methyl-6-chloro-7-methylsulfamyl-1,2,4-benzothiadiazine-1,1-dioxide in 150 ml. of chlorosulfonic acid is heated for 5 hours on the steam bath (95° C.). The solution then is cooled and poured onto crushed ice whereupon a precipitate forms which is removed by filtration and then air-dried. After recrystallization from a mixture of acetone-hexane, there is obtained 43.2 g. of 2-methylsulfamyl-5-chloroaniline-4-sulfonyl chloride, M.P. 159–162° C.

*Analysis.*—Calculated for $C_7H_8Cl_2N_2O_4S_2$: C, 26.34; H, 2.53; N, 8.78. Found: C, 26.99; H, 2.64; N, 8.72.

*Step B.*—The sulfonyl chloride (43.2 g.) obtained as described in step A is added to 250 ml. of 28% ammonium hydroxide and the solution then is heated on the steam bath for one hour. After cooling a precipitate forms which is separated by filtration and air-dried yielding 25.2 g. of 2-methylsulfamyl-4-sulfamyl-5-chloroaniline, M.P. 185–188° C. Recrystallization from water raises the melting point to 189–191° C. An isomorphic form also exists that melts at 168–170° C.

*Analysis.*—Calculated for $C_7H_{10}ClN_3O_4S_2$: C, 28.05; H, 3.36; N, 14.02. Found C, 28.19; H, 3.41; N, 13.95.

*Step C.*—By replacing the 2,4-disulfamylaniline and the gamma-carbomethoxybutyryl chloride employed in Example 1, step A, by equivalent quantities of 2-methylsulfamyl-4-sulfamyl-5-chloroaniline and ethoxalyl chloride respectively, and following substantially the same procedure described in Example 1, step A, there is obtained 5 - chloro - 4 - sulfamyl - 2 - methylsulfamyl - N - ethoxalylaniline, M.P. 227–228° C.

*Analysis.*—Calculated for $C_{11}H_{14}ClN_3O_7S_2$: C, 33.04; H, 3.45; N, 10.53. Found: C, 33.41; H, 3.61; N, 10.52.

*Step D.*—The above ethoxalylaniline is cyclized by substantially the same procedure described in Example 1, step B, to give 2-methyl-3-carboethoxy-6-chloro-7-sulfamyl-1,2,4-benzothiadiazine-1,1-dioxide.

EXAMPLE 11

*2-methyl-3-carboxy-6-chloro-7-sulfamyl-1,2,4-benzothiadiazine-1,1-dioxide*

The 2 - methyl - 3 - carbethoxy - 6 - chloro - 7 - sulfamyl - 1,2,4 - benzothiadiazine - 1,1 - dioxide (from Example 10) is hydrolyzed by substantially the same method described in Example 2 to give 2-methyl-3-carboxy-6-chloro - 7 - sulfamyl - 1,2,4 - benzothiadiazine - 1,1 - dioxide.

EXAMPLE 12

*3-carbohexoxy-6-chloro-7-sulfamyl-1,2,4-benzothiadiazine-1,1-dioxide*

Dihexyloxalate, 75 g. (0.28 mole) and potassium acetate 28.6 g. and 30 ml. of water are combined and heated on a water bath with stirring overnight. The solution then is concentrated to 50 ml. and 75 ml. of ethanol plus 200 ml. of ether added whereupon a precipitate is formed which is collected, giving hexyl potassium oxalate. This product 17 g. (0.08 mole) is moistened with a little ether and then added to a cooled solution of thionyl chloride (20 g.). The reaction mixture is heated on a steam bath overnight then cooled and treated with 100 ml. of ether. The precipitate which forms is removed by suction filtration and the residue washed with ether. The washing and filtrate then are combined and concentrated to dryness on the steam bath. The residue then is distilled in vacuo to give 6.8 g. of hexoxalyl chloride, B.P. 90–95° C. at 15 mm. pressure.

*Step B.*—By following substantially the same procedure described in Example 1, step A, but replacing the gamma-carbomethoxybutyryl chloride there employed by an equimolecular quantity of hexoalyl chloride, and following substantially the same procedure described in Example 1, step A, there is obtained 5-chloro-2,4-disulfamyl-N-hexoxalylaniline which, after recrystallization from a 50% ethanol-water mixture, melts at 203–204° C.

*Analysis.*—Calculated for $C_{14}H_{20}ClN_3O_7S_2$: C, 38.04; H, 4.67; N, 9.51. Found: C, 37.84; H, 4.58; N, 9.53.

*Step C.*—The above hexoxalylaniline is cyclized by substantially the same procedure described in Example 1, step B, to give 3-carbohexoxy-6-chloro-7-sulfamyl-1,2,4-benzothiadiazine-1,1-dioxide.

EXAMPLE 13

*3-(p-carbethoxyphenyl)-6-chloro-7-sulfamyl-1,2,4-benzothiadiazine-1,1-dioxide*

*Step A.*—By replacing the gamma-carbomethoxybutyryl chloride employed in Example 1, step A, by an equimolecular quantity of p-carbethoxybenzoyl chloride, and following substantially the same procedure described in Example 1, step A, there is obtained 5-chloro-2,4-disulfamyl-N-(p-carbethoxybenzoyl)aniline, which, after crystallization from a mixture of acetone and petroleum ether, melts at 254–255° C.

*Analysis.*—Calculated for $C_{16}H_{16}ClN_3O_7S_2$: C, 41.60; H, 3.49; N, 9.10. Found: C, 42.09; H, 3.72; N, 9.03.

*Step B.*—The aniline compound obtained above is cyclized by substantially the same procedure described in Example 1, step B, to give 3-(p-carbethoxyphenyl)-6-chloro-7-sulfamyl-1,2,4-benzothiadiazine-1,1-dioxide.

EXAMPLE 14

*3-(p-carboxyphenyl)-6-chloro-7-sulfamyl-1,2,4-benzothiadiazine-1,1-dioxide*

The 3 - (p - carbethoxyphenyl) - 6 - chloro - 7 - sulfamyl-1,2,4-benzothiadiazine-1,1-dioxide (from Example 13) is hydrolyzed by substantially the same method described in Example 2 to give 3-(p-carboxyphenyl)-6-chloro-7-sulfamyl-1,2,4-benzothiadiazine-1,1-dioxide.

EXAMPLE 15

*3-(p-methylcarbamylphenyl)-6-chloro-7-sulfamyl-1,2,4-benzothiadiazine-1,1-dioxide*

By replacing the aniline compound employed in Example 3 by an equivalent quantity of 5-chloro-2,4-disulfamyl-N-(p-carbethoxybenzoyl)aniline (from Example 13, step A) and following substantially the same procedure described in Example 3, there is obtained 3-(p-methylcarbamylphenyl) - 6 - chloro - 7 - sulfamyl - 1,2,4 - benzothiadiazine-1,1-dioxide.

EXAMPLE 16

*3-(beta-carbomethoxyethyl)-6-chloro-7-sulfamyl-1,2,4-benzothiadiazine-1,1-dioxide*

*Step A.*—By replacing the gamma-carbomethoxybutyryl chloride employed in Example 1, step A, by an equimolecular quantity of the acid chloride of methyl hydrogen succinate obtained as described above, and following substantially the same procedure described in Example 1, step A, there is obtained 5-chloro-2,4-disulfamyl-N-(beta-carbomethoxypropionyl)aniline, M.P. 190–191° C.

*Analysis.*—Calculated for $C_{11}H_{14}ClN_3O_7S_2$: C, 33.04; H, 3.53; N, 10.51. Found: C, 33.23; H, 3.53; N, 10.56.

*Step B.*—A solution of 2.0 g. of the aniline compound thus obtained in 50 ml. of 25% methanolic trimethylamine is allowed to stand at room temperature for 24 hours and concentrated to dryness in vacuo. The residue is crystallized from methanol to give 3-(beta-carbomethoxyethyl) - 6 - chloro - 7 - sulfamyl - 1,2,4 - benzothiadiazine-1,1-dioxide, M.P. 266–267° C.

*Analysis.*—Calculated for $C_{11}H_{12}ClN_3O_6S_2$: C, 34.60; H, 3.17; N, 11.01. Found: C, 34.56; H, 3.29; N, 11.01.

EXAMPLE 17

*3-(β-hydrazinocarbonylethyl)-6-chloro-7-sulfamyl-1,2,4-benzothiadiazine-1,1-dioxide*

By following substantially the same procedure described in Example 16, step B, but using 20% aqueous hydrazine in place of methanolic trimethylamine, there is obtained 3 - (β-hydrazinocarbonylethyl)-6-chloro-7-sulfamyl-1,2,4-benzothiadiazine-1,1-dioxide, M.P. 144–145° C.

*Analysis.*—Calculated for $C_{10}H_{12}ClN_5O_5S_2$: C, 31.45; H, 3.17; N, 18.34. Found: C, 31.63; H, 3.45; N, 18.15.

EXAMPLE 18

*3-(β-carboxyethyl)-6-chloro-7-sulfamyl-1,2,4-benzothiadiazine-1,1-dioxide*

A solution of 3.6 g. of 3-(β-carbomethoxyethyl)-6-chloro-7-sulfamyl-1,2,4-benzothiadiazine-1,1-dioxide, obtained as described in Example 16, in 25 ml. of water, 25 ml. of acetic acid and 25 ml. of concentrated hydrochloric acid is heated under reflux for 2 hours and cooled in an ice-bath. The product is collected and recrystallized from alcohol-water to give 3-(β-carboxyethyl)-6-chloro-7-sulfamyl - 1,2,4 - benzothiadiazine-1,1-dioxide, M.P. 275–276° C.

*Analysis.*—Calculated for $C_{10}H_{10}ClN_3O_6S_2$: C, 32.65; H, 2.74; N, 11.42. Found: C, 32.34; H, 3.09; N, 11.21.

EXAMPLE 19

*3-(β-carbamylethyl)-6-chloro-7-sulfamyl-1,2,4-benzothiadiazine-1,1-dioxide*

A solution of 3.0 g. of 5-chloro-2,4-disulfamyl-N-(β-carbomethoxypropionyl)aniline (obtained as described in Example 16, step A), in 50 ml. of 28% ammonium hydroxide is allowed to stand at room temperature for 24 hours and then concentrated to dryness in vacuo. The product is recrystallized from alcohol-water to give 3-(β-carbamylethyl) - 6 - chloro-7-sulfamyl-1,2,4-benzothiadiazine-1,1-dioxide, M.P. 264–265° C.

*Analysis.*—Calculated for $C_{10}H_{11}ClN_4O_5S_2$: C, 32.76; H, 3.02; N, 15.28. Found: C, 32.94; H, 3.12; N, 15.20.

EXAMPLE 20

*3-(β-methylcarbamylethyl)-6-chloro-7-sulfamyl-1,2,4-benzothiadiazine-1,1-dioxide*

A solution of 5.0 g. of 5-chloro-2,4-disulfamyl-N-(β-carbomethoxypropionyl)aniline, obtained as described in Example 16, step A, in 100 ml. of 30% aqueous methylamine is allowed to stand at room temperature for 24 hours and then concentrated to dryness in vacuo. Water (90 ml.) is added and the mixture filtered from 5-chloro-2,4-disulfamylaniline. The filtrate is acidified and the precipitate is collected and recrystallized from water to give 3 - (β - methylcarbamylethyl)-6-chloro-7-sulfamyl-1,2,4-benzothiadiazine-1,1-dioxide, M.P. 264–266° C.

*Analysis.*—Calculated for $C_{11}H_{13}ClN_4O_5S_2$: C, 34.69; H, 3.44; N, 14.71. Found: C, 34.94; H, 3.39; N, 14.60.

EXAMPLE 21

*3-(β-dimethylcarbamylethyl)-6-chloro-7-sulfamyl-1,2,4-benzothiadiazine-1,1-dioxide*

A solution of 3.8 g. of 5-chloro-2,4-disulfamyl-N-(β-carbomethoxypropionyl)aniline (from Example 16, step A) in 50 ml. of 25% aqueous dimethylamine is allowed to stand at room temperature for 24 hours and concentrated to dryness in vacuo. The residue is treated with water (90 ml.), acidified and the product crystallized from alcohol-water to give 3-($\beta$-dimethylcarbamylethyl)-6-chloro-7-sulfamyl-1,2,4-benzothiadiazine-1,1-dioxide, M.P. 255° C.

*Analysis.*—Calculated for $C_{12}H_{15}ClN_4O_5S_2$: C, 36.50; H, 3.83; N, 14.19. Found: C, 36.68; H, 3.98; N, 14.15.

EXAMPLE 22

*3-carbomethoxy-6-chloro-7-sulfamyl-1,2,4-benzothiadiazine-1,1-dioxide*

*Step A.*—A solution of 57 g. (0.2 mole) of 5-chloro-2,4-disulfamylaniline and 30 g. (0.22 mole) of ethoxalyl chloride in 450 ml. of dioxane is heated under reflux for 24 hours, cooled and the product collected on the filter. The product is recrystallized from a 50% mixture of alcohol and water giving 5-chloro-2,4-disulfamyl-N-ethoxalylaniline, M.P. 222–223° C.

*Analysis.*—Calculated for $C_{10}H_{12}ClN_3O_7S_2$: C, 31.13; H, 3.14; N, 10.89. Found: C, 31.20; H, 3.62; N, 10.69.

*Step B.*—A solution of 3.0 g. of the ethoxalylaniline obtained as described above in 50 ml. of 25% methanolic trimethylamine is allowed to stand at room temperature for 24 hours and concentrated to dryness in vacuo. The residue is dissolved in water, acidified and the product is recrystallized from alcohol-water to give 3-carbomethoxy-6-chloro-7-sulfamyl-1,2,4-benzothiadiazine-1,1-dioxide, M.P. 259–260° C.

*Analysis.*—Calculated for $C_9H_8ClN_3O_6S_2$: C, 30.55; H, 2.28; N, 11.88. Found: C, 30.86; H, 2.58; N, 11.89.

EXAMPLE 23

*3-carboethoxy-6-chloro-7-sulfamyl-1,2,4-benzothiadiazine-1,1-dioxide*

When the same reaction described in Example 22, step B, is run using 25% trimethylamine in ethanol instead of methanol, there is obtained 3-carboethoxy-6-chloro-7-sulfamyl-1,2,4-benzothiadiazine-1,1-dioxide, M.P. 275–276° C.

*Analysis.*—Calculated for $C_{10}H_{10}ClN_3O_6S_2$: C, 32.65; H, 2.74; N, 11.43. Found: C, 32.44; H, 3.04; N, 11.36.

EXAMPLE 24

*3-carboxy-6-chloro-7-sulfamyl-1,2,4-benzothiadiazine-1,1-dioxide*

A solution of 3.0 g. of 5-chloro-2,4-disulfamyl-N-ethoxalylaniline obtained as described in Example 22, step A, in 50 ml. of 25% aqueous trimethylamine is allowed to stand at room temperature for 24 hours and concentrated to dryness in vacuo at room temperature. The residue is dissolved in water, acidified with dilute hydrochloric acid and the precipitate collected on the filter and recrystallized from water to give 3-carboxy-6-chloro-7-sulfamyl-1,2,4-benzothiadiazine-1,1-dioxide, M.P. 348–349° C.

*Analysis.*—Calculated for $C_8H_6ClN_3O_6S_2$: C, 28.28; H, 1.78; N, 12.37. Found: C, 28.04; H, 2.19; N, 12.30.

EXAMPLE 25

*Potassium salt of 3-carboxy-6-chloro-7-sulfamyl-1,2,4-benzothiadiazine-1,1-dioxide*

A suspension of 5-chloro-2,4-disulfamyl-N-ethoxalylaniline (7.7 g. obtained as described in Example 22, step A) in a solution of potassium acetate (2 g.) in 30 ml. of water is heated on the steam bath for two hours and cooled. The precipitate is recrystallized from ethanol-water to give the potassium salt of 3-carboxy-6-chloro-7-sulfamyl-1,2,4-benzothiadiazine-1,1-dioxide, M.P. 293–294° C.

*Analysis.*—Calculated for $C_8H_5ClKN_3O_6S_2$: C, 25.43; H, 1.33; N, 11.12; K, 10.35. Found: C, 25.45; H, 1.87; N, 10.97; K, 9.35.

EXAMPLE 26

*3-allylcarboxylate-6-chloro-7-sulfamyl-1,2,4-benzothiadiazine-1,1-dioxide*

A mixture of 3-potassium carboxylate-6-chloro-7-sulfamyl-1,2,4-benzothiadiazine-1,1-dioxide (0.91 g. obtained as described in Example 25), allyl bromide (0.28 g.) and ethanol (25 ml.) is heated under reflux for one hour and cooled. The product is collected, washed with water and recrystallized from alcohol-water to give 3-allylcarboxylate-6-chloro-7-sulfamyl-1,2,4-benzothiadiazine-1,1-dioxide, M.P. 293–294° C.

EXAMPLE 27

*3-carbamyl-6-chloro-7-sulfamyl-1,2,4-benzothiadiazine-1,1-dioxide*

A solution of 7.7 g. of 5-chloro-2,4-disulfamyl-N-ethoxalylaniline (from Example 22, step A) in 100 ml. of 28% ammonium hydroxide is allowed to stand at room temperature for 24 hours and concentrated to dryness in vacuo. The product is recrystallized from a dimethylformamide-ethanol-water mixture to give 3-carbamyl-6-chloro-7-sulfamyl-1,2,4-benzothiadiazine-1,1-dioxide, M.P. 355–358° C.

*Analysis.*—Calculated for $C_8H_7ClN_4O_5S_2$: C, 28.36; H, 2.08; N, 16.54. Found: C, 28.55; H, 2.13; N. 16.51.

EXAMPLE 28

*3-carbomethoxy-6-bromo-7-sulfamyl-1,2,4-benzothiadiazine-1,1-dioxide*

*Step A.*—By replacing the 5-chloro-2,4-disulfamylaniline employed in Example 22, step A by an equimolecular quantity of 5-bromo-2,4-disulfamylaniline and following substantially the same procedure described in Example 22, step A, there is obtained 5-bromo-2,4-disulfamyl-N-ethoxalylaniline, M.P. 227–228° C.

*Analysis.*—Calculated for $C_{10}H_{12}BrN_3O_7S_2$: C, 27.91; H, 2.81; N, 9.77. Found: C, 27.84; H, 3.08; N, 9.67.

*Step B.*—The above ethoxalylaniline can be cyclized by substantially the same method described in Example 22, step B to give 3-carbomethoxy-6-bromo-7-sulfamyl-1,2,4-benzothiadiazine-1,1-dioxide.

EXAMPLE 29

*3-carboxy-6-bromo-7-sulfamyl-1,2,4-benzothiadiazine-1,1-dioxide*

The 3-carbomethoxy-6-bromo-7-sulfamyl-1,2,4-benzothiadiazine-1,1-dioxide (from Example 28) can be hydrolyzed by substantially the same method described in Example 2 to give 3-carboxy-6-bromo-7-sulfamyl-1,2,4-benzothiadiazine-1,1-dioxide.

EXAMPLE 30

*3-(diethylcarbamyl)-6-bromo-7-sulfamyl-1,2,4-benzothiadiazine-1,1-dioxide*

By replacing the aniline compound and the dimethylamine employed in Example 21 by equivalent quantities of 5-bromo-2,4-disulfamyl-N-ethoxalylaniline (from Example 28, step A) and aqueous diethylamine, and following substantially the same procedure described in Example 21, there is obtained 3-(diethylcarbamyl)-6-bromo-7-sulfamyl-1,2,4-benzothiadiazine-1,1-dioxide.

EXAMPLE 31

*3-carbethoxy-6-chloro-4-methyl-7-sulfamyl-1,2,4-benzothiadiazine-1,1-dioxide*

A solution of 6.0 g. of 5-chloro-2,4-disulfamyl-N-methylaniline and 3.0 g. of ethoxalyl chloride in 75 ml. of dioxane is heated under reflux for 17 hours and then concentrated to dryness in vacuo. The residue is recrystallized from a mixture of ethanol and water giving 3-carbethoxy-6-chloro-4-methyl-7-sulfamyl-1,2,4-benzothiadiazine-1,1-dioxide, M.P. 275–276° C.

*Analysis.*—Calculated for $C_{11}H_{12}ClN_3O_6S_2$: C, 34.60; H, 3.16; N, 11.00. Found: C, 34.95; H, 3.26; N, 10.96.

EXAMPLE 32

*3-carboxy-6-chloro-4-methyl-7-sulfamyl-1,2,4-benzothiadiazine-1,1-dioxide*

The 3-carbethoxy-6-chloro-4-methyl-7-sulfamyl - 1,2,4-benzothiadiazine-1,1-dioxide (from Example 31) can be hydrolyzed by substantially the same procedure described in Example 2 to give 3-carboxy-6-chloro-4-methyl-7-sulfamyl-1,2,4-benzothiadiazine-1,1-dioxide.

EXAMPLE 33

*3-(beta-carbomethoxyvinyl)-6-chloro-7-sulfamyl-1,2,4-benzothiadiazine-1,1-dioxide*

By replacing the gamma-carbomethoxybutyryl chloride employed in Example 1, step A, by an equimolecular quantity of the acid chloride of methyl hydrogen maleate and following substantially the same procedure described in Example 1, step A, there is obtained 5-chloro-2,4-disulfamyl-N-beta-carbomethoxyacrylylaniline. This product can be cyclized by substantially the same method described in step B of Example 1 to give 3-(beta-carbomethoxyvinyl)-6-chloro-7-sulfamyl-1,2,4 - benzothiadiazine - 1,1-dioxide.

EXAMPLE 34

*3-carbethoxy-5,6-dichloro-7-sulfamyl-1,2,4-benzothiadiazine-1,1-dioxide*

*Step A.*—5-chloro-2,4-disulfamylaniline (25.7 g. 0.09 mole) is suspended in a mixture of water (100 ml.), acetic acid (200 ml.) and concentrated hydrochloric acid (150 ml.) and heated on the steam bath with stirring until complete solution is obtained. The solution is cooled to 75° C. and 30% hydrogen peroxide (9 ml.) is added. The mixture is allowed to come to room temperature with stirring, then cooled in an ice bath and the precipitate collected on the filter, washed with water and dried to give 16 g. of 5,6-dichloro-2,4-disulfamylaniline. After recrystallization from a 6% mixture of alcohol and water, there is obtained colorless needles melting at 288–289° C.

*Step B.*—A solution of 6.4 g. of 5,6-dichloro-2,4-disulamylaniline and 2.8 g. of ethoxalyl chloride in 75 ml. of dioxane is heated under reflux for 24 hours and concentrated to dryness in vacuo. The product, 3-carbethoxy-5,6-dichloro-7-sulfamyl-1,2,4-benzothiadiazine-1,1 - dioxide, is recrystallized from alcohol-water, M.P. 288–289° C.

*Analysis.*—Calculated for $C_{10}H_9Cl_2N_3O_6S_2$: C, 29.86; H, 2.26; N, 10.45. Found: C, 30,10; H, 2.38; N, 10.61.

EXAMPLE 35

*3-potassium carboxylate-5,6-dichloro-7-potassium sulfamyl-1,2,4-benzothiadiazine-1,1-dioxide*

A solution of 2.1 g. of 3-carbethoxy-5,6-dichloro-7-sulfamyl-1,2,4-benzothiadiazine-1,1 - dioxide and 1.0 g. of potassium acetate in 40 ml. of water is heated on the steam bath for 2 hours and concentrated to dryness in vacuo. The product is recrystallized from alcohol-water to give 3-potassium carboxylate-5,6-dichloro - 7 - potassium sulfamyl-1,2,4-benzothiadiazine - 1,1 - dioxide, M.P. greater than 350° C.

*Analysis.*—Calculated for $C_8H_3Cl_2K_2N_3O_6S_2$: C, 21.33; H, 0.67; N, 9.33; K, 17.36. Found: C, 21.63; H, 1.12; N, 9.28; K, 17.02.

EXAMPLE 36

*3-carboxy-5,6-dichloro-7-sulfamyl-1,2,4-benzothiadiazine-1,1-dioxide*

The 3-carbethoxy-5,6-dichloro-7-sulfamyl-1,2,4-benzothiadiazine-1,1-dioxide can be hydrolyzed by substantially the same procedure described in Example 2 to give 3-carboxy-5,6-dichloro-7-sulfamyl - 1,2,4-benzothiadiazine-1,1-dioxide.

EXAMPLE 37

*3-methylcarbamyl-5,6-dichloro-7-sulfamyl-1,2,4-benzothiadiazine-1,1-dioxide*

By replacing the aniline compound employed in Example 20 by an equivalent quantity of 5,6-dichloro-2,4-disulfamyl-N-ethoxalylaniline (prepared as described in Example 34, step B, with the exception heating of the reactants is carried out for only 5 hours instead of 24 hours), and following substantially the same method described in Example 20, there is obtained 3-methylcarbamyl-5,6 - dichloro-7-sulfamyl-1,2,4 - benzothiadiazine-1,1-dioxide.

EXAMPLE 38

*2-n-butyl-3-carboethoxy-6-n-butyl-7-n-butylsulfamyl-1,2,4-benzothiadiazine-1,1-dioxide*

*Step A.*—m-Butylaniline (0.5 mole) is added portionwise with stirring to 375 ml. of chlorosulfonic acid in a 3-liter round-bottomed 3-necked flask cooled in an ice bath. Sodium chloride (350 g.) is added portionwise over a period of one to two hours and the mixture then heated gradually in an oil bath to 150° C. After three hours at 150–160° C., the flask is cooled thoroughly in an ice bath and the contents treated with a liter of cold water. The product is extracted with ether and the extract washed with water and dried over sodium sulfate. After removal of ether on the steam bath, the residual 5-bromoaniline-2,4-disulfonyl chloride is obtained. After recrystallization from a mixture of benzene and hexane the product melts at 130–132° C. The disulfonyl chloride then is added portionwise to n-butylamine (50 ml.) and heated for approximately 1 hour on the steam bath. After cooling to room temperature, the solid product is collected on the filter, washed with water and crystallized from a mixture of alcohol and water to give 5-butyl-2,4-di-(N-n-butylsulfamyl)-aniline.

*Step B.*—A solution of 0.2 mole of the thus obtained product and 0.22 mole of ethoxalyl chloride in 450 ml. of dioxane is heated under reflux for about 24 hours, cooled and the product collected on the filter. The product is recrystallized from a mixture of 50% alcohol and water to give 5-butyl-2,4-di-(N-n-butylsulfamyl)-N-ethoxalylaniline. This product can be cyclized by substantially the same procedure described in Example 23 to give 2-n-butyl-3-carboethoxy-6-n-butyl - 7-n-butylsulfamyl-1,2,4-benzothiadiazine-1,1-dioxide.

EXAMPLE 39

*3-carbobutoxy-6-methoxy-7-sulfamyl-1,2,4-benzothiadiazine-1,1-dioxide*

A solution of 0.2 mole of 5-methoxy-2,4-disulfamylaniline and 0.22 mole of butoxalyl chloride in 450 ml. of dioxane is heated under reflux for approximately 24 hours, cooled and the product collected on the filter. After recrystallization from a mixture of 50% alcohol and water there is obtained 5-methoxy-2,4-disulfamyl-N-butoxalylaniline. This product is cyclized by substantially the same procedure described in Example 1, step B, to give 3-carbobutoxy-6-methoxy-7-sulfamyl-1,2,4-benzothiadiazine-1,1-dioxide.

EXAMPLE 40

*3-carboethoxy-6-sulfamyl-7-chloro-1,2,4-benzothiadiazine-1,1-dioxide*

A solution of 0.2 mole of 4-chloro-2,5-disulfamylaniline and 0.22 mole of ethoxalyl chloride in 450 ml. dimethylformamide is heated under reflux for approximately 24 hours, cooled and the product collected on the filter to give 4-chloro-2,5-disulfamyl-N-ethoxalylaniline. This product is cyclized by substantially the same method described in Example 23, to give 3-carboethoxy-6-sulfamyl-7-chloro-1,2,4-benzothiadiazine-1,1-dioxide.

EXAMPLE 41

*3-(6'-carbomethoxyhexyl)-7-sulfamyl-1,2,4-benzothiadiazine-1,1-dioxide*

A solution of 0.2 mole of 2,4-disulfamylaniline and 0.22 mole of the acid chloride of methyl hydrogen suberate in 450 ml. of dioxane is heated under reflux for approximately 24 hours, cooled and the product collected on the filter to give 2,4-disulfamyl-N-(7'-carbomethoxyheptanoyl)aniline. This product is cyclized by substantially the same method described in Example 1, step B, to give 3-(6'-carbomethoxyhexyl)-7-sulfamyl-1,2,4-benzothiadiazine-1,1-dioxide.

EXAMPLE 42

*3-carboethoxy-6-nitro-7-sulfamyl-1,2,4-benzothiadiazine-1,1-dioxide*

A solution of 0.2 mole of 5-nitro-2,4-disulfamylaniline and 0.22 mole of ethoxalyl chloride in 450 ml. of dioxane is heated under reflux for about 24 hours, cooled and the product collected on the filter to give 5-nitro-2,4-disulfamyl-N-ethoxalylaniline. This product is cyclized by substantially the same method described in Example 23 to give 3-carboethoxy-6-nitro-7-sulfamyl-1,2,4-benzothiadiazine-1,1-dioxide.

Each of the esters prepared in Examples 38 through 42 (as well as other esters prepared by the process of this invention) can be hydrolyzed to the free acid by substantially the same method described in Example 2 to give:

| Ex. No. | Product Formed |
|---|---|
| 43 | 2-n-butyl-3-carboxy-6-n-butyl-7-n-butylsulfamyl-1,2,4-benzothiadiazine-1,1-dioxide |
| 44 | 3-carboxy-6-methoxy-7-sulfamyl-1,2,4-benzothiadiazine-1,1-dioxide. |
| 45 | 3-carboxy-6-sulfamyl-7-chloro-1,2,4-benzothiadiazine-1,1-dioxide. |
| 46 | 3-(6'-carboxyhexyl)-7-sulfamyl-1,2,4-benzothiadiazine-1,1-dioxide. |
| 47 | 3-carboxy-6-nitro-7-sulfamyl-1,2,4-benzothiadiazine-1,1-dioxide. |

Similarly each of the aniline compounds prepared as described in Example 38 through 42 (as well as other esters of N-carboxyacylanilines prepared as described hereinabove) can be treated with 20% aqueous methylamine by substantially the same method described in Example 3 to give:

| Ex. No. | Product Formed |
|---|---|
| 48 | 2-n-butyl-3-methylcarbamyl-6-n-butyl-7-n-butylsulfamyl-1,2,4-benzothiadiazine-1,1-dioxide. |
| 49 | 3-methylcarbamyl-6-methoxy-7-sulfamyl-1,2,4-benzothiadiazine-1,1-dioxide. |
| 50 | 3-methylcarbamyl-6-sulfamyl-7-chloro-1,2,4-benzothiadiazine-1,1-dioxide. |
| 51 | 3-(6'-methylcarbamylhexyl)-7-sulfamyl-1,2,4-benzothiadiazine-1,1-dioxide. |
| 52 | 3-methylcarbamyl-6-nitro-7-sulfamyl-1,2,4-benzothiadiazine-1,1-dioxide. |

EXAMPLE 53

*3-benzoyl-5,6-dichloro-7-sulfamyl-1,2,4-benzothiadiazine-1,1-dioxide*

*Step A.*—A solution of 6.4 g. of 5,6-dichloro-2,4-disulfamylaniline and 3.5 g. of phenylglyoxylic acid chloride in 150 ml. of dioxane is heated under reflux for 24 hours and concentrated to dryness in vacuo. The product is recrystallized from acetone-petroleum ether to give 5,6-dichloro-2,4-disulfamyl - N - phenylglyoxylylaniline, M.P. 251–252° C.

*Analysis.*—Calculated for $C_{14}H_{11}Cl_2N_3O_6S_{23}$: C, 37.18; H, 2.45; N, 9.29. Found: C, 37.41; H, 2.65; N, 9.22.

*Step B.*—A solution of 1 g. of 5,6-dichloro-2,4-disulfamyl-N-phenylglyoxylylaniline in 50 ml. of 25% methanolic trimethylamine is allowed to stand at room temperature for 24 hours and concentrated to dryness in vacuo. The residue is dissolved in 100 ml. of 50% alcohol-water, acidified and the product recrystallized from acetone-petroleum ether to give 3-benzoyl-5,6-dichloro-7-sulfamyl-1,2,4 - benzothiadiazine - 1,1 - dioxide, M.P. 298–300° C.

*Analysis.*—Calculated for $C_{14}H_9Cl_2N_3O_5S_2$: C, 38.72; H, 2.09; N, 9.68. Found: C, 39.37; H, 2.50; N, 9.55.

EXAMPLE 54

*3-benzoyl-6-chloro-7-sulfamyl-1,2,4-benzothiadiazine-1,1-dioxide*

*Step A.*—A solution of 5.7 g. of 5-chloro-2,4-disulfamylaniline and 3.5 g. of phenylglyoxylyl chloride in 100 ml. of dioxane is heated on the steam bath for 2 hours. The product is collected on the filter and recrystallized from a dimethylformamide-ethanol-water mixture to give 5-chloro-2,4-disulfamyl-N-phenylglyoxylylaniline, M.P. 274–275° C.

*Analysis.*—Calculated for $C_{14}H_{12}ClN_3O_6S_2$: C, 40.24; H, 2.90; N, 10.05. Found: C, 40.64; H, 3.50; N, 10.04.

*Step B.*—A solution of 2.0 g. of 5-chloro-2,4-disulfamyl-N-phenylglyoxylylaniline in 50 ml. of 25% methanolic trimethylamine is allowed to stand at room temperature for 24 hours and evaporated to dryness in vacuo. The residue is taken up in 100 ml. of 50% ethanol-water, filtered and acidified with acetic acid. The product is crystallized from acetone-petroleum ether, M.P. 308–310° C.

*Analysis.*—Calculated for $C_{14}H_{10}ClN_3O_5S_2$: C, 42.06; H, 2.52; N, 10.51. Found: C, 42.36; H, 2.90; N, 10.48.

EXAMPLE 55

*3-carbobutoxy-6-chloro-7-sulfamyl-1,2,4-benzothiadiazine-1,1-dioxide*

*Step A.*—Dibutyloxalate, 84 g. (0.415 mole) is admixed with 42.5 g. of potassium acetate and 50 ml. of water and the mixture heated with stirring on the steam bath. The solvent then is removed in vacuo and the residue treated with 100 ml. of ethanol and 250 ml. of ether whereupon a precipitate is formed which is separated by filtration and dried, yielding 69 g. (90%) of butyl potassium oxalate. This product 29.4 g. (0.16 mole) is moistened with a little ether and admixed with stirring with 40 g. (0.34 mole) of thionyl chloride cooled with ice. The reaction mixture then is allowed to warm to room temperature and then heated overnight on the steam bath. The reaction mixture thereafter is chilled and diluted with 100 ml. of ether and filtered. The residue is again washed with ether and the filtrate and washing combined and the ether removed by distillation. The residue is vacuum distilled at 125–135° C. at 45 mm. pressure yielding 7 g. of butyloxalyl chloride.

*Step B.*—By following the procedure of Example 1, step A, and using an equimolecular quantity of butyloxalyl chloride in place of the gamma-carbomethoxybutyryl chloride employed in Example 1, step A, there is obtained 5-chloro-2,4-disulfamyl - N - butoxalylaniline which, after recrystallization from a 50% mixture of ethanol and water, melts at 219–220° C.

*Analysis.*—Calculated for $C_{12}H_{16}ClN_3O_7S_2$: C, 34.82; H, 3.90; N, 10.15. Found: C, 34.60; H, 4.14; N, 10.15.

*Step C.*—The butoxalylaniline obtained is cyclized by substantially the same method described in Example 1, step B, to give 3-carbobutoxy-6-chloro-7-sulfamyl-1,2,4-benzothiadiazine-1,1-dioxide.

EXAMPLE 56

*3-carboethoxy-5-methyl-6-chloro-7-sulfamyl-1,2,4-benzothiadiazine-1,1-dioxide*

*Step A.*—2-methyl-3-chloroaniline (0.5 mole) is added portionwise with stirring to 375 ml. of chlorosulfonic acid in a 3-liter, round-bottom, 3-necked flask cooled in an ice bath. Sodium chloride (3.50 g.) is added portionwise over a period of one to two hours and the mixture then heated gradually in an oil bath to 150° C. After 3 hours at 150–160° C., the flask is cooled thoroughly in an ice bath and the contents treated with a liter of cold water. The product is extracted with ether and the extract washed with water and dried over sodium sulfate. The product, 5-chloro-6-methylaniline-2,4-disulfonyl chloride is obtained by removal of the ether on the steam bath. The disulfonyl chloride is added portionwise to 50 ml. of 28% ammonium hydroxide and heated for approximately one hour on the steam bath. After cooling to room temperature, the solid product, 5-chloro-6-methyl-2,4-disulfamylaniline, is collected on the filter.

*Step B.*—A solution of 0.2 mole of the thus obtained product and 0.22 mole of ethoxalyl chloride in 450 ml. of dioxane is heated under reflux for about 24 hours, cooled and the product collected on the filter to give 5-chloro-6-methyl-2,4-disulfamyl-N-ethoxalylaniline.

*Step C.*—A solution of the thus obtained ethoxalylaniline in 50 ml. of 25% ethanolic trimethylamine is allowed to stand at room temperature for 24 hours and concentrated to dryness in vacuo to give 3-carboethoxy-5-methyl-6-chloro-7-sulfamyl-1,2,4-benzothiadiazine-1,1-dioxide.

The novel compounds of this invention are effective diuretic and/or saluretic agents. Because of this property, they are useful in therapy for the treatment of any condition resulting from an excessively high concentration of sodium in the body such as in the treatment of edematous conditions resulting, for example, from congestive heart failure.

The dosage of the novel compounds of this invention will vary over a wide range depending upon the age and weight of the patient to be treated and also depending upon the particular ailment to be treated. For these reasons tablets, pills, capsules and the like containing, for example, 100, 150, 250, 500 mg. of active ingredient can be made available for the symptomatic adjustment of the dosage to the individual patient. These dosages appear to be well below the toxic dose of the novel compounds of this invention as evidenced by the acute intravenous $LD_{50}$ in mice of one of the compounds falling within the scope of this invention, that is, of the compound 3-carboxy-6-chloro-1,2,4-benzothiadiazine-1,1-dioxide, which is found to be 1,440 mg./kg. of body weight, and when administered orally the $LD_{50}$ is found to be between 5–10 g./kg. of body weight. Other compounds, such as 3-($\beta$-methylcarbamylethyl)-6-chloro-7-sulfamyl-1,2,4-benzothiadiazine-1,1-dioxide and 3-($\beta$-dimethylcarbamylethyl)-6-chloro-7-sulfamyl-1,2,4-benzothiadiazine-1,1-dioxide, have an $LD_{50}$ of greater than 640 mg./kg. when administered to mice intraperitoneally.

As each of the compounds of this invention can be incorporated in a dosage form similar to that described in the following example or in other dosage forms suitable for oral or parenteral administration which can be prepared by well-known methods, only one example is included herein to illustrate the preparation of a representative dosage form.

EXAMPLE 57

*Dry-filled capsules containing 100 mg. of active ingredient per capsule*

Per capsule, mg.

3-carboxy-6-chloro-7-sulfamyl-1,2,4-benzothiadiazine-1,1-dioxide _____ 100
Lactose _____ 175
Capsule size No. 2.

The 3-carboxy-6-chloro-7-sulfamyl-1,2,4-benzothiadiazine-1,1-dioxide is reduced to a No. 60 powder, lactose then is passed through a No. 60 bolting cloth onto the powder. The combined ingredients are admixed for 10 minutes and then filled into No. 2 dry gelatin capsules.

While the above examples describe the separation of certain compounds which are illustrative of the novel compounds of this invention, and a certain specific dosage form suitable for administering the novel compounds, it is to be understood that the invention is not to be limited to the specific compounds described in the examples or by the specific reaction conditions described for the preparation of these compounds or by the specific ingredients included in the pharmaceutical preparation but is to be understood to embrace variations and modifications thereof which fall within the scope of the appended claims.

What is claimed is:

1. A compound having the structure

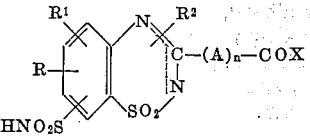

wherein R is selected from the group consisting of hydrogen, halogen, lower alkyl, lower alkoxy and nitro; $R^1$ is selected from the group consisting of hydrogen, halogen and lower alkyl; $R^2$ is selected from the group consisting of hydrogen and lower alkyl; $R^3$ is selected from the group consisting of hydrogen and lower alkyl; A is selected from the group consisting of lower alkylene, lower alkenylene and phenylene; $n$ represents zero and one; X is selected from the group consisting of lower alkoxy, lower-alkenyloxy, phenoxy, hydroxy, O-alkali metal, hydrazine and phenyl.

2. A compound having the structure

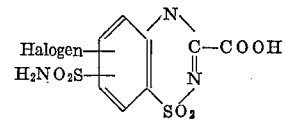

3. 3-carboxy-6-chloro-7-sulfamyl-1,2,4-benzothiadiazine-1,1-dioxide.

4. A compound having the structure

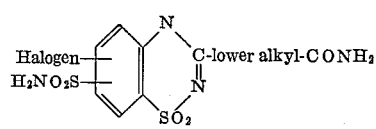

5. A compound having the structure

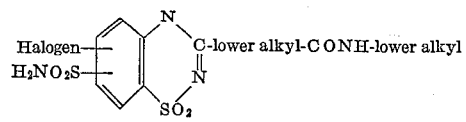

6. 3-($\beta$-methylcarbamylethyl)-6-chloro-7-sulfamyl-1,2,4-benzothiadiazine-1,1-dioxide.

7. A compound having the structure

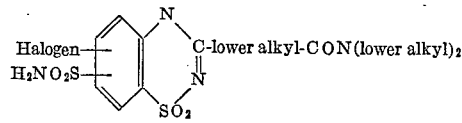

8. 3-($\beta$-dimethylcarbamylethyl)-6-chloro-7-sulfamyl-1,2,4-benzothiadiazine-1,1-dioxide.

9. Compounds having the structure

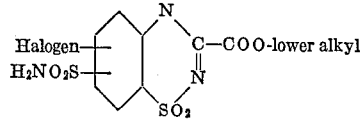

10. 3-($\beta$-carbamylethyl)-6-chloro-7-sulfamyl-1,2,4-benzothiadiazine-1,1-dioxide.

11. 3-carbomethoxy-6-chloro-7-sulfamyl-1,2,4-benzothiadiazine-1,1-dioxide.

12. A compound having the structure

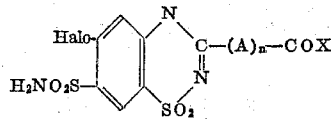

wherein
A is lower alkylene;
n represents zero and one; and
X is selected from the group consisting of
hydroxy,
lower alkoxy,
lower alkenyloxy,
O-alkali metal,
amino, and
hydrazino.

References Cited by the Examiner

UNITED STATES PATENTS 3,057,862  10/1962  Yale _____ 260—243

FOREIGN PATENTS 36,956  3/1959  Luxemburg.

OTHER REFERENCES

Australian Abstract, 51,470/, Feb. 11, 1960.
Australian Abstract, 63,341/60, Feb. 9, 1961.

NICHOLAS S. RIZZO, Primary Examiner.

IRVING MARCUS, Examiner.